United States Patent
Ropkins et al.

(10) Patent No.: US 10,656,061 B2
(45) Date of Patent: May 19, 2020

(54) PARTICULATE CALIBRATION AND GENERATION SIMULATOR FOR PARTICLE MEASUREMENT AND NUMBER

(71) Applicant: 3DATX Corporation, Buffalo, NY (US)

(72) Inventors: Karl Ropkins, Ilkley (GB); David Miller, Clarence Center, NY (US); John William Hynd, Clarence Center, NY (US); Jodi Miller, Clarence Center, NY (US); Craig Pfister, Prospect, PA (US); Andrew Burnette, El Dorado Hills, CA (US); Gurdas Sandhu, Cary, NC (US)

(73) Assignee: 3DATX Corporation, Buffalo, NY (US)

( * ) Notice: Subject to any disclaimer, the term of this patent is extended or adjusted under 35 U.S.C. 154(b) by 187 days.

(21) Appl. No.: 15/748,797

(22) PCT Filed: Aug. 1, 2016

(86) PCT No.: PCT/US2016/045018
§ 371 (c)(1),
(2) Date: Jan. 30, 2018

(87) PCT Pub. No.: WO2017/020039
PCT Pub. Date: Feb. 2, 2017

(65) Prior Publication Data
US 2018/0217038 A1    Aug. 2, 2018

Related U.S. Application Data

(60) Provisional application No. 62/198,944, filed on Jul. 30, 2015.

(51) Int. Cl.
*G01N 1/44*       (2006.01)
*G01N 1/28*       (2006.01)
(Continued)

(52) U.S. Cl.
CPC ............... *G01N 1/44* (2013.01); *G01N 1/28* (2013.01); *F01N 3/021* (2013.01); *G01N 15/02* (2013.01);
(Continued)

(58) Field of Classification Search
CPC ............... G01N 1/44; G01N 15/1012; G01N 2001/2893; G01N 21/01; F01N 3/021; B01D 37/04; C07C 51/12
See application file for complete search history.

(56) References Cited

U.S. PATENT DOCUMENTS 4,154,088 A    5/1979  Werner
4,670,137 A    6/1987  Koseki et al.
(Continued)

*Primary Examiner* — Harshad R Patel
*Assistant Examiner* — Nigel H Plumb
(74) *Attorney, Agent, or Firm* — Hodgson Russ LLP

(57) ABSTRACT

An apparatus and method for generating a controlled, predictable, reproducible and variable-size distribution of particulate matter (PM), particle number (PN) and/or facsimile/simulation, derived from vaporizing and condensing a specialized liquid, utilizing a vapor delivery device; a filter capability so as to remove a significant amount of ambient PM/PN as a secondary calibration process for the identification of fine and ultra-fine particles (e.g., 0.3 micrometers and smaller) as well as a computer-controlled ability to perform a pre-determined series of calibration routines, housed in a container.

20 Claims, 12 Drawing Sheets

(51) Int. Cl.
  *G01N 15/10* (2006.01)
  *G01N 15/02* (2006.01)
  *G01N 15/06* (2006.01)
  *F01N 3/021* (2006.01)

(52) U.S. Cl.
  CPC ......... *G01N 15/06* (2013.01); *G01N 15/1012* (2013.01); *G01N 2001/2893* (2013.01)

(56) References Cited

U.S. PATENT DOCUMENTS

| | | |
|---|---|---|
| 4,761,074 A | 8/1988 | Kohsaka et al. |
| 8,318,977 B2 | 11/2012 | Zinobile et al. |
| 2003/0082825 A1 | 5/2003 | Lee et al. |
| 2004/0200265 A1 | 10/2004 | Eden et al. |
| 2005/0042763 A1 | 2/2005 | Anderson et al. |
| 2006/0032501 A1 | 2/2006 | Hale et al. |
| 2007/0028662 A1 | 2/2007 | Wei et al. |
| 2011/0103778 A1 | 5/2011 | Batts |

PARTICULATE CALIBRATION AND GENERATION SIMULATOR FOR PARTICLE MEASUREMENT AND NUMBER

CROSS-REFERENCE TO RELATED APPLICATIONS

This application claims priority to the provisional patent application filed Jul. 30, 2015 and assigned U.S. App. No. 62/198,944, the disclosure of which is hereby incorporated by reference.

FIELD OF THE DISCLOSURE

The present disclosure relates to an apparatus for generating particulate matter, vapor, and nanoparticles derived from vaporizing and atomizing a fluid designed to simulate the variable-size distribution of particulate matter and number(s) typical to internal combustion engines, carbon-based fuels, and other types of particle and nano-particle generating systems.

BACKGROUND OF THE DISCLOSURE

Particle emissions can have an adverse effect on the environment, having the potential, depending on level of exposure, composition, and size-distribution, to be both profoundly harmful to human health and detrimental to ecosystems and man-made infrastructure alike. As a result, many industries face ever increasing pressure to monitor, reduce and/or limit certain emissions generated by internal combustion engines, stacks, other systems that generate emissions, or other sources.

Vehicle and transportation sector-related emissions continue to be a leading source of greenhouse gas (GHG) and air pollution in urban areas around the globe. As an example, there were over 260 million vehicles in the United States (U.S.) in 2012 that emitted 33% (1,750 million metric tons) of total U.S. $CO_2$ emissions. In the same year, the U.S. transportation sector share of total U.S. emissions for CO, $NO_x$, and particulate matter (PM) were 54%, 59%, and 8%, respectively. Therefore, significant resources continue to be focused on emission reduction tactics which typically fall into two categories: current fleet inventory upgrade (e.g., roadside and/or engine bay inspection and maintenance (I/M) programs, aftermarket engine/vehicle/fuel programs, etc.) or new vehicle manufacturing (e.g., revisions of standards for newly manufactured vehicles, etc.).

When fine particulate was first identified as a possible health hazard, environmental agencies found it most convenient and accurate to measure particulate emissions in terms of how much particulate mass was emitted from a given pollution source or how much mass was contained in the ambient air we breathe. However, as particulate sources became cleaner in response to regulations and consumer demand, investigators discovered that the number of ultra-fine particles in ambient air is more closely correlated with health effects than the total mass of those particles.

The U.S. Environmental Protection Agency (USEPA) defines PM as a complex mixture of extremely small particles and liquid droplets made up of a number of components, including acids (such as nitrates and sulfates), organic chemicals, metals, and soil or dust particles. The USEPA has employed the concept of vehicle exhaust PM evaluation since the 1970's starting with the capture of particulate emission samples on filter paper collected from samples of vehicle exhaust tested in laboratories. The mass collected samples were subsequently determined using a gravimetric process. The PM was then properly catalogued and documented.

More recently, the development of a particle number (PN) measurement system by the European Union in 2007 enabled a more accurate and repeatable measurement of the number of particulates emitted. Additional EU objectives were to minimize required changes to the current type approval facilities, to employ an understandable metric, and for the system to be simple to operate.

Accurate emission(s) data are needed in order to properly evaluate the impact of emission reduction strategies. In doing so, it may be important to differentiate between the differing sizes of PM/PN in order to better understand both the process that produced them and the potential solution(s) for their reduction. Specifically, atmospheric particulate sizes typically range from a few nanometers up to several micrometers. Coarse particles larger than one micrometer are dominated by biological sources (e.g., spores, pollen, bacteria, etc.) or mineral sources.

Fine particles (less than a micrometer) are typically elemental carbon or leftover constructs from gases such as sulfates, nitrates, or organic carbon. It is the PM/PN that originates from the combustion processes which tend to be of significant interest. The size range of elemental carbon (e.g. "ultra-fines"), or particles smaller than 0.1 micrometer, is dominated by such particles due to the combustion process associated with on-road, off-road, and non-road transportation activities. Such particulates have been cited as dangerous due to toxic trace compounds (e.g., heavy metals, polycyclic aromatic hydrocarbons, etc.). The USEPA and the European Union's Joint Research Centre (JRC) have declared that the concentration of such particles is highly variable, and appears to demonstrate a significant pattern of variation, especially close to urban areas and traffic congestion.

In addition, the early focus of regulation and, therefore, the manufacturing sectors was on PM which led to a change in the particle size distributions produced by many regulated particulate sources. For example, earlier generation vehicles tended to emit larger masses of particulate dominated by very coarse (and often visible) matter, while newer vehicles tend to emit less by mass but much smaller (and arguably, based on current scientific understanding, more harmful) particles. As these global standards continue to become stricter and the nature of the particles that they were introduced to manage evolves, it is imperative that both measurement technologies and associated evaluation systems be developed that maximize our potential to implement effective emission abatement strategies.

One challenge currently faced is the routine calibration and bench-marking of measurement methods that quantify finer particulate emissions and/or coarse-to-fine size distributions. As an example, opacity based monitoring technologies have been widely used in vehicle testing programs, such as in the California Heavy Duty Vehicle Inspection Program (HDVIP). Instruments used in these programs can also be reliably calibrated using "optical transfer reduction," which involves, for example, using a glass lens with an accurately measured degree of surface etching placed in the optical analyzers light beam path. This means both the test method and the validation procedure can be performed at roadside locations allowing "per-vehicle" management of vehicle particulate emissions. However, this system is only amenable to the regulation of larger/coarser particulates and is not sensitive to the finer PM emitted from more modern trucks.

There are a range of monitoring technologies that allow both the characterization of particulate size distribution and measurement of the finer particulate emissions that now make up a component of particulate emissions. There are also multiple methods for the calibration and testing of such systems, but these typically rely on the use of laboratory-specified and designed equipment. This reliance is, in part, because the standards have to be extremely exacting in order to faithfully replicate actual "emission events" and in part because alternative commercially-scalable options have not yet been identified. As an example, recent PM/PN calibration systems and particulate generators utilized in the automotive industry have attempted to faithfully recreate soot, nano-particles, and carbon pollutants. Not only is this approach exceedingly costly, it also requires a significant amount of power, heat, and reinforced housing to contain the process required for the generation of such particulates, restricting its application anywhere except highly controlled laboratory environments.

What are needed are particulate generation/calibration approaches that can be applied on a more routine basis, such as for the routine bench-marking and quality assurance of PM, PN, or particulate size distribution data collected in real-world portable emission measurement system (PEMS) studies, large scale dynamometer testing procedures, and future "per-vehicle" testing approaches similar the existing HDVIP scheme.

BRIEF SUMMARY OF THE DISCLOSURE

In a first embodiment, an apparatus for generating reference particulate (particulate matter (PM)/particle number (PN)) and creating conditions for a PM/PN simulation and/or facsimile event is provided. The apparatus comprises a housing having an inlet and an outlet; a filter configured to remove of a specific diameter of particulates; a removable liquid exhaust tank mounted in a sealed tank reservoir within a flow path, the liquid exhaust tank configured to contain a fluid; a sealed tank reservoir; a heating element mounted within the sealed tank reservoir; and one or more sensors to measure at least one of pressure, flow, temperature, or humidity. The heating element is configured to provide a variable fluid vaporization rate. The heating element is configured to atomize the fluid The fluid can include a liquid exhaust vaporizer fuel comprising at least one of vegetable glycerin, propylene glycol, or saline; and, optionally, a scrubber fluid comprising a blend of at least one water-soluble alcohol and at least one solvent.

The apparatus can further include four flow control valves. A first flow control valve is disposed between the inlet and the outlet. A second flow control valve is disposed between the inlet and the filter. A third flow control valve is disposed between the sealed tank reservoir and the filter. A fourth flow control valve is disposed between the sealed tank reservoir and the outlet.

The apparatus can include a controller. The controller can be configured to: open the first flow control valve and close the second, third, and fourth control valves such that ambient air flow through the apparatus; open the second flow control valve and close the first, third, and fourth control valves such that filtered air flows through the apparatus; open the third flow control valve and close the first, second, and fourth control valves such that an unaltered PM/PN vapor sample flows through the apparatus; and open the fourth flow control valve and close the first, second, and third control valves such that a filtered PM/PN vapor sample flows through the apparatus.

The filter can be configured to provide particle sizing and particle distribution functions in both the ambient air sampling and a liquid exhaust vaporization process. A filter flow path is designed to be utilized by both the ambient air sample and the vapor sample.

The apparatus can further include a pump.

The apparatus can further include a rechargeable power source within the housing and electronically coupled to the heating element; flow control valves electronically coupled to the rechargeable power source; and an electronics sub-system electronically coupled to the rechargeable power source. The electronics sub-system is configured to control the heating element and the flow control valves. The electronics sub-system is configured to remotely control a vaporizing and atomization process using length of time and strength of charge thereby causing the heating element to vaporize a variable portion of the fluid.

The electronic sub-system can include a logic processor, a power board, a wireless or wired communications component, and a voltage-to-digital converter.

The outlet can be configured to couple to a separate and external PM/PN measurement device or a separate and external pump mechanism.

In a second embodiment, a method for controlling the vaporization of a fluid is provided. The method comprises atomizing a fluid using a heating element; and generating reference particulate and creating conditions for a PM/PN simulation and/or facsimile event.

The reference particulate can include a PM or a PN.

The method can further comprise creating conditions for a PM or PN simulation.

The fluid can comprise a liquid exhaust vaporizer fuel comprising at least one of vegetable glycerin, propylene glycol, or saline; and, optionally, a scrubber fluid comprising a blend of at least one water-soluble alcohol and at least one solvent.

The method can further comprise providing an apparatus including: a housing having an inlet and an outlet; a filter configured to remove of a specific diameter of particulates; a removable liquid exhaust tank mounted in a sealed tank reservoir within a flow path, the liquid exhaust tank configured to contain the fluid; a sealed tank reservoir; a heating element mounted within the sealed tank reservoir; and four flow control valves. A first flow control valve is disposed between the inlet and the outlet. A second flow control valve is disposed between the inlet and the filter. A third flow control valve is disposed between the sealed tank reservoir and the filter. A fourth flow control valve is disposed between the sealed tank reservoir and the outlet. The heating element is configured to provide a variable fluid vaporization rate. The heating element is configured to atomize the fluid.

The method can further comprise opening the first flow control valve and closing the second, third, and fourth control valves such that ambient air flow through the apparatus; opening the second flow control valve and closing the first, third, and fourth control valves such that filtered air flows through the apparatus; opening the third flow control valve and closing the first, second, and fourth control valves such that an unaltered PM/PN vapor sample flows through the apparatus; and opening the fourth flow control valve and closing the first, second, and third control valves such that a filtered PM/PN vapor sample flows through the apparatus.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Disclosed herein is an apparatus and method for generating reference particulate (particulate matter (PM)/particle number (PN)) and creating conditions for a PM/PN simulation and/or facsimile event. The apparatus and method embodiments disclosed herein reduce the power, heat, containment, as well as weight and mobility challenges by employing a vaporization and condensation method which simulates the small, mid-sized, and large particle variation(s) observed in PM/PN "emission events" such as vehicle engines, stationary exhaust stacks, etc. The vaporization/condensation medium is supplied in a liquid reservoir which is heated electronically to induce vaporization of the liquid in a gaseous medium. The vaporized liquid is then cooled as it is dispersed and carried along within gaseous medium, where it condenses into droplets of varying sizes and thereby generates a reference particulate sample. The particulate size distribution and composition is modified using the liquid fuel formulation, vaporization/condensation design, and subsequent sample conditioning such as filtration. Fine control of the process is achieved by fine control of the heating rate and duration. Additional feedbacks on conditions during the reference sample generation step are provided by in-line sensor(s).

Vaporizing and condensing produces nanoparticle scale droplets in the gas medium which condense either spontaneously due to super-saturation of the vapor, or on nucleation sites in the gas medium, such as ambient particulate or metal particles shed from internal parts of the apparatus.

A PM/PN facsimile event is described as an event that does not include combustion of a carbon-based fuel, yet creates a dispersion of particles/particle size(s) and number similar to those produced by the internal combustion of a carbon-based fuel.

The device comprises a housing, a liquid tank disposed within the housing and adapted to hold a fluid, a heating element disposed within the housing and being operable to vaporize at least a portion of the fluid, a filter, a power source disposed within the housing and electronically coupled to the power source and the heating element, an electronics portion adapted to control the heating element and the power source, an outlet extending from the liquid tank to an opening in the housing, and various sensors (e.g., pressure, flow, temperature, humidity) so as to provide input for calibration of one or more PM/PN measurement systems and/or atmosphere(s).

Figure 1:
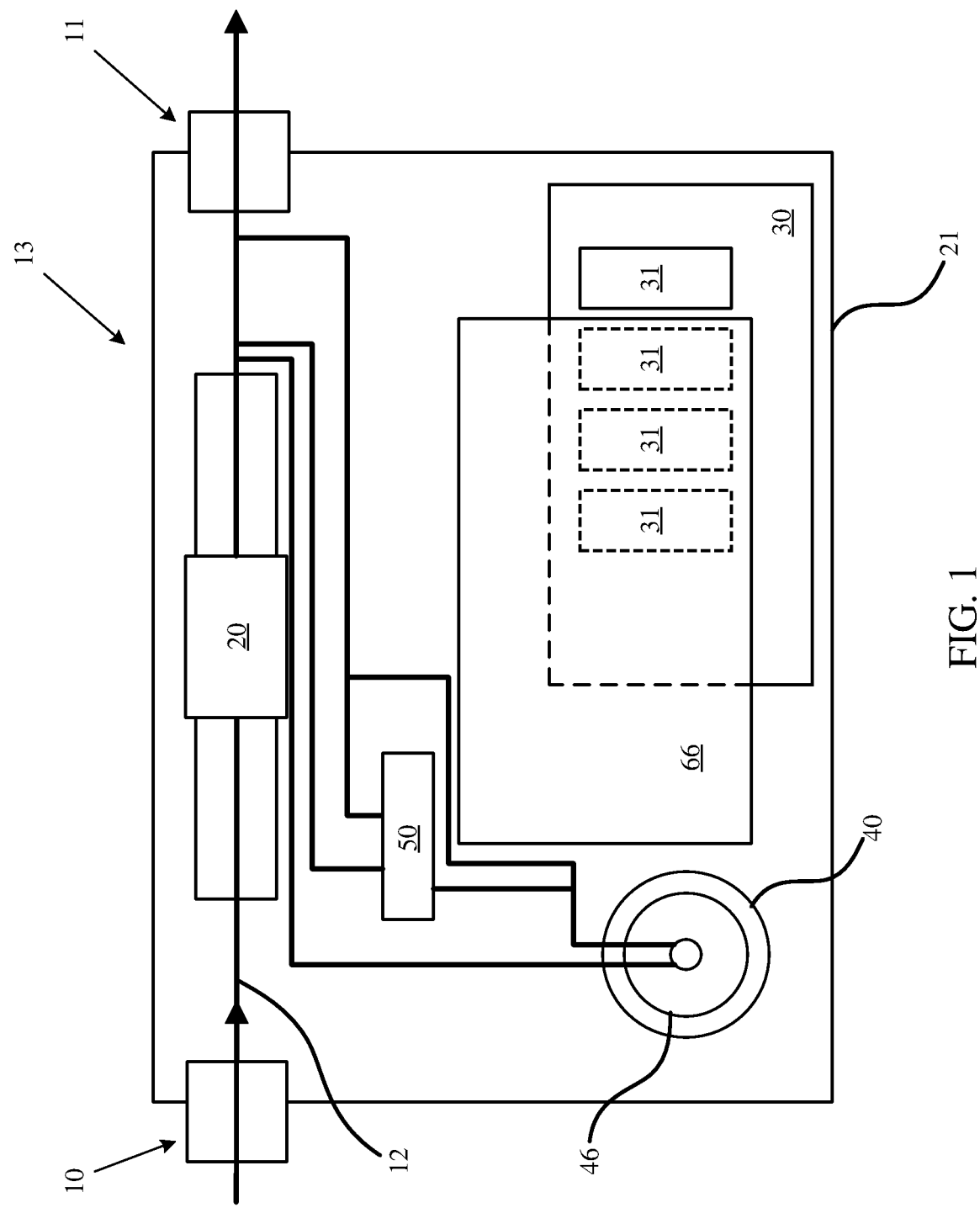
FIG. 1 is a schematic representation of the upper plate in accordance with an embodiment of the present disclosure.
Figure 2:
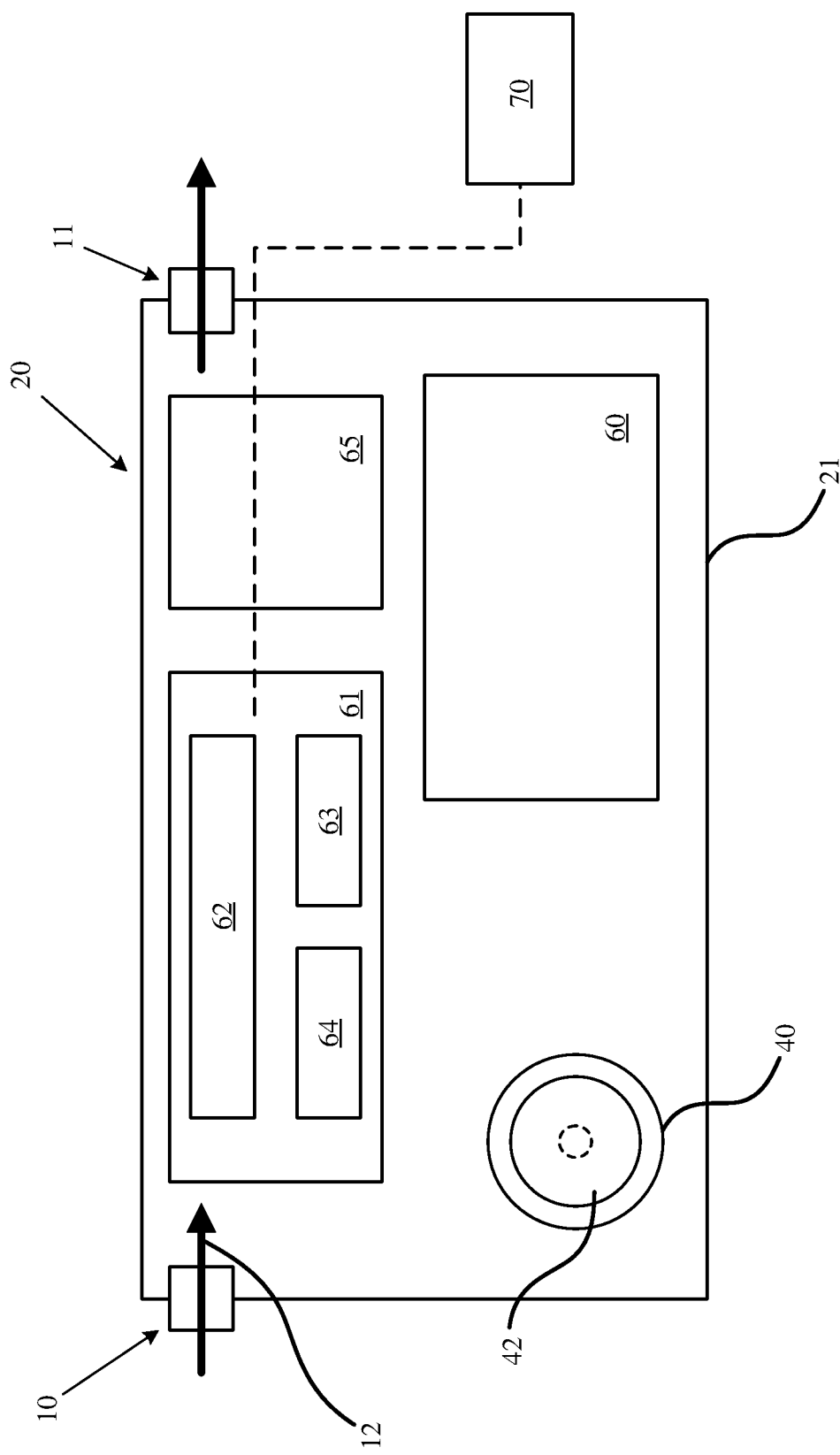
FIG. 2 is a schematic representation of the lower plate in accordance with an embodiment of the present disclosure.
Figure 3:
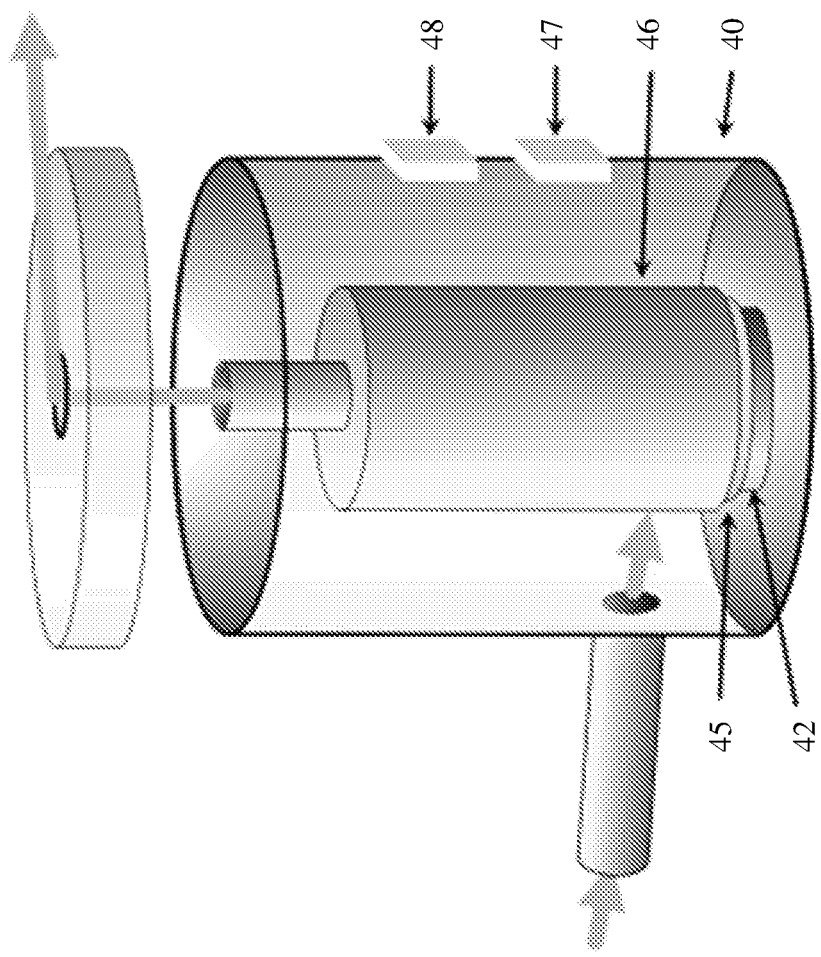
FIG. 3 is a representation of the tank reservoir in accordance with an embodiment of the present disclosure.
Figure 4:
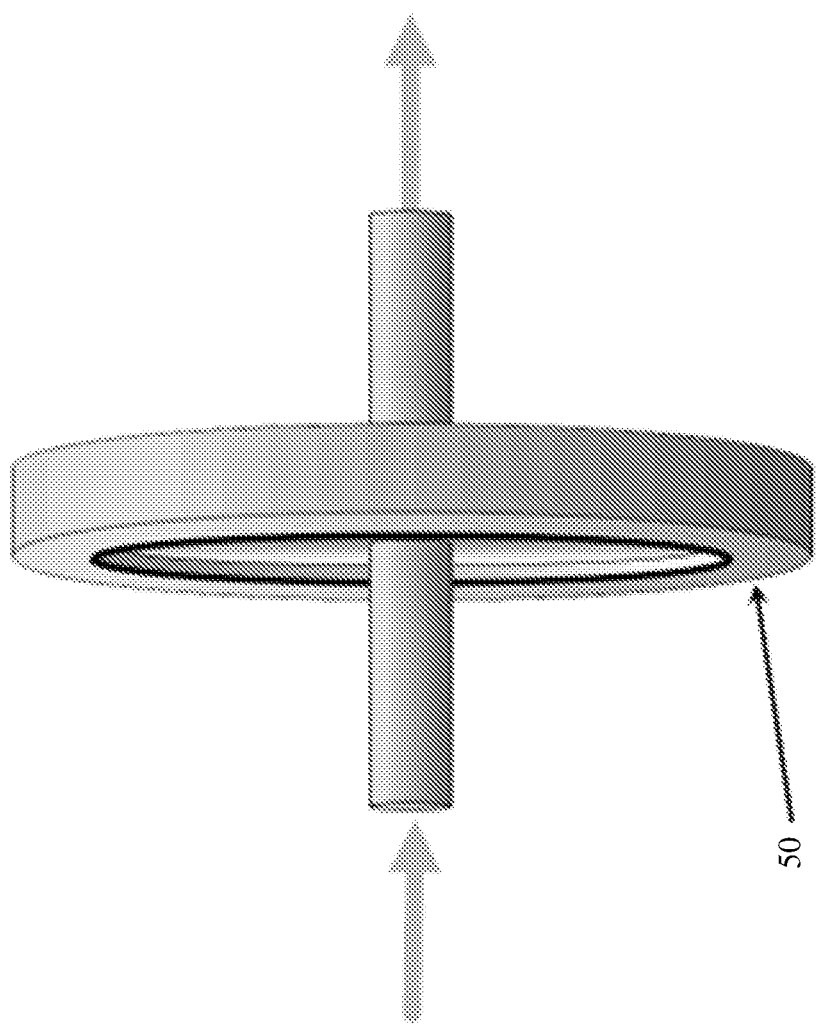
FIG. 4 is a representation of a filter in accordance with an embodiment of the present disclosure.
Figure 5:
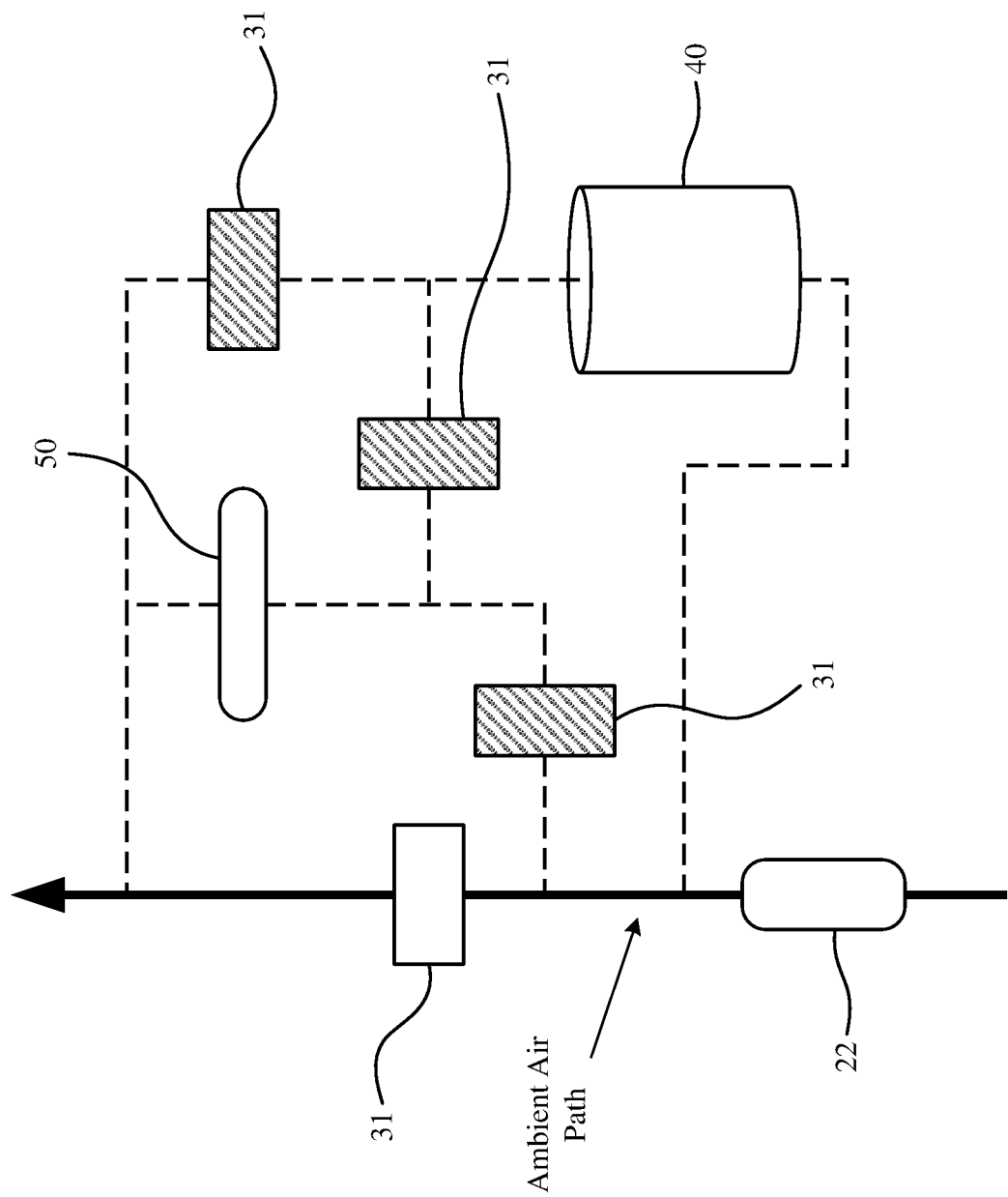
FIGS. 5-10 are diagrams showing steps #1-6 of a computer-controlled pre-optimized calibration example.
Figure 6:
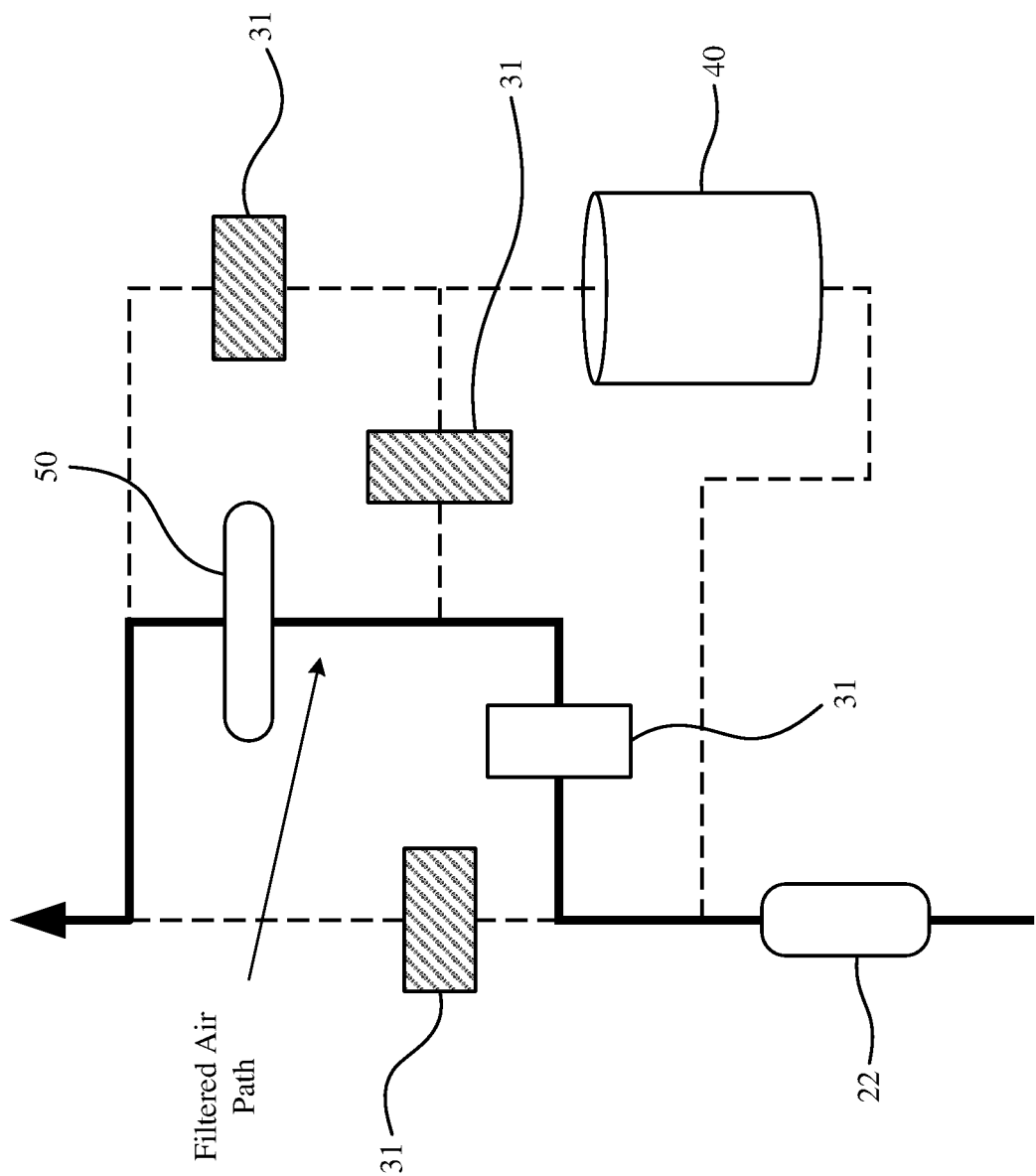
Figure 7:
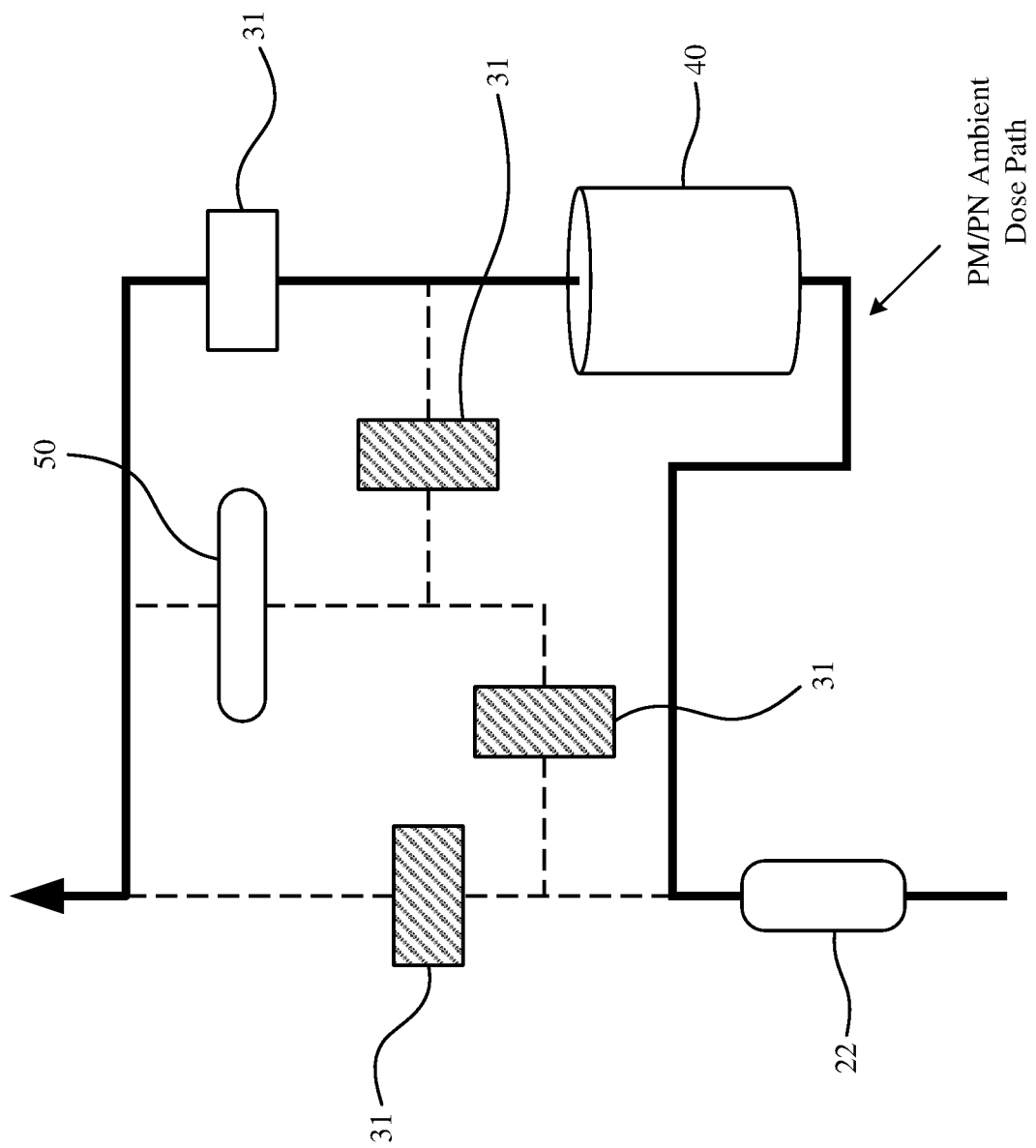
Figure 8:
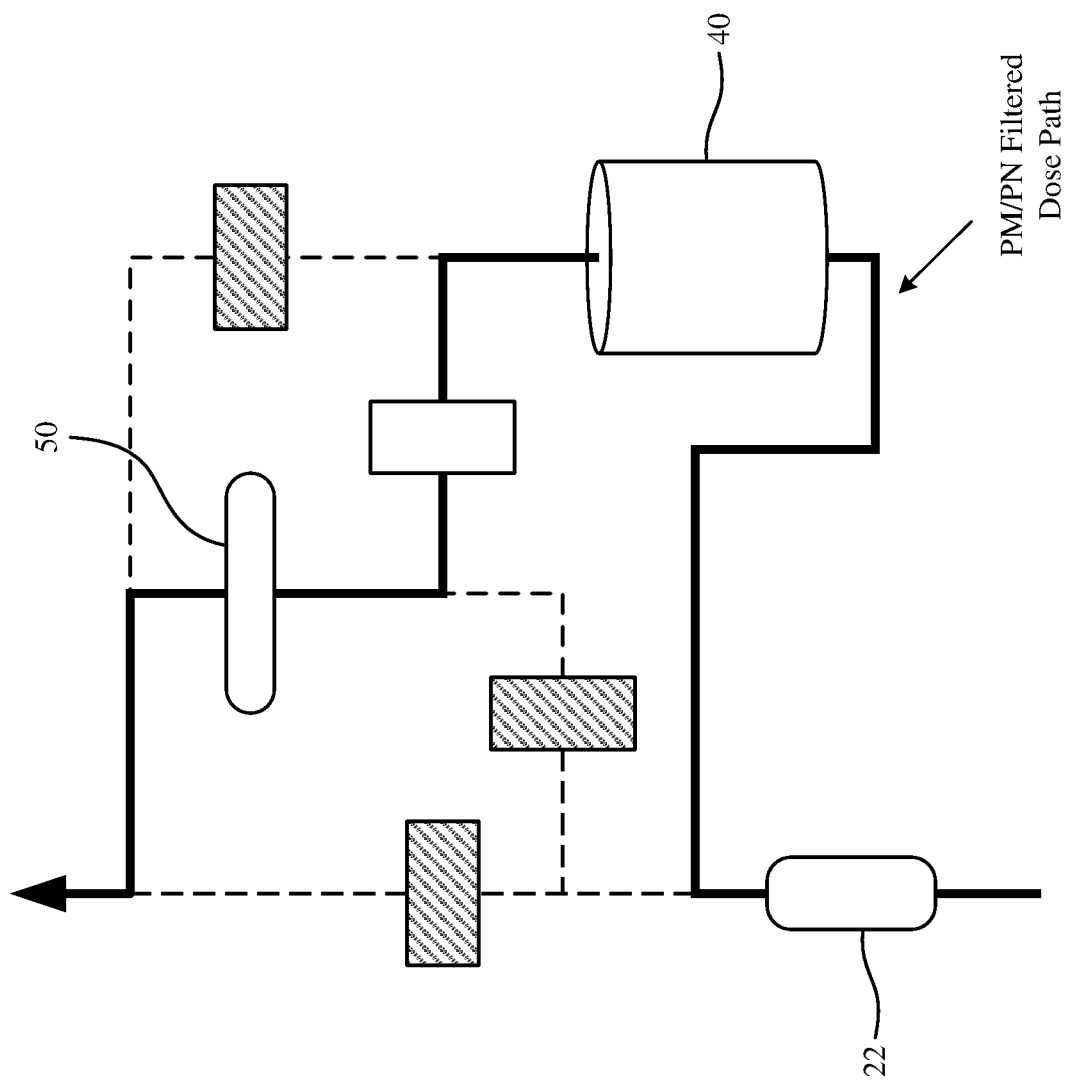
Figure 9:
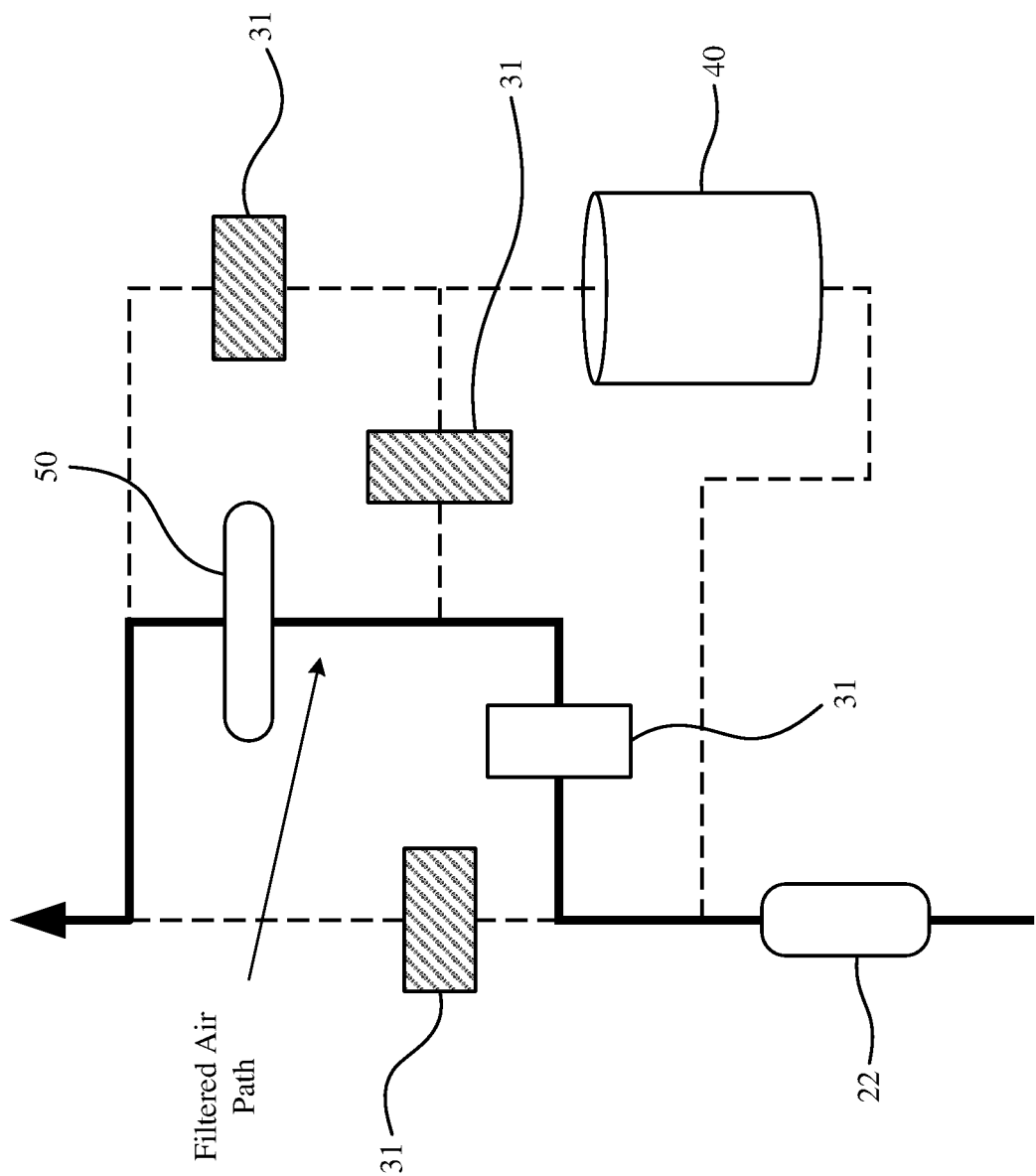
Figure 10:
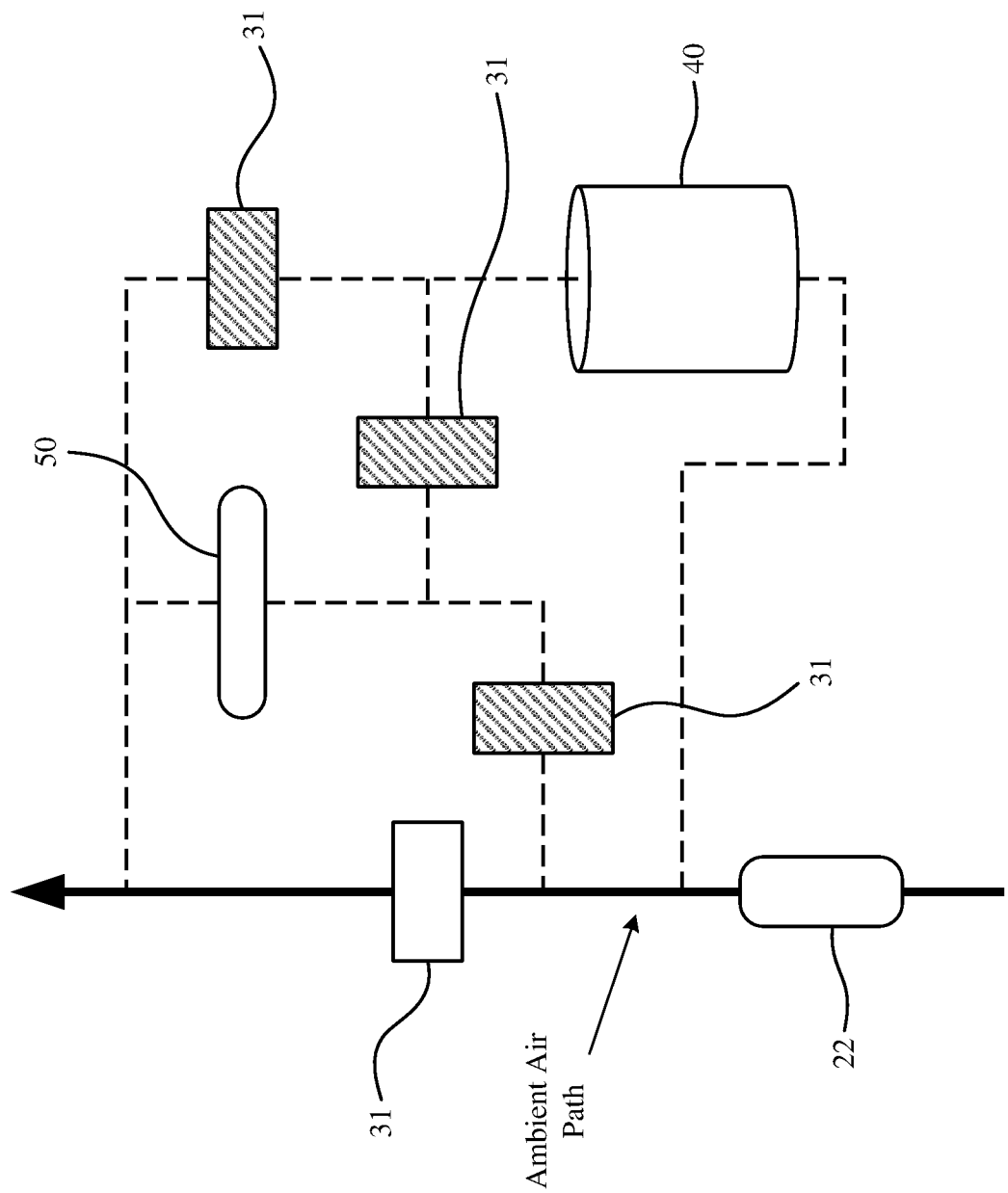

In FIGS. 1-4, the device 13 includes a housing 21. FIGS. 1 and 2 represent an upper plate and lower plate within the device 13. For example, the sealed tank reservoir 40 extends between the upper and lower plates. The upper plate and lower plate may be the same size or different sizes. The device includes a sample inlet 10 and sample outlet 11 in the housing 21. The sample outlet 11 can connect with a conduit for transporting the generated sample to atmosphere which is transported through the flow pathway by employing negative pressure, created by either an internal or external pump mechanism (not illustrated), thereby causing the generated sample air to flow from the air out via the container and the conduit to atmosphere. A gaseous medium may be air or other mixtures of atmospheric gases.

The device 13 includes a pressure sensor 20, temperature sensor 47, and humidity sensor 48. Additional sensors also may be included. These sensors are used to monitor the particles/particle sizes and generation conditions. For example, additional sensors can measure localized atmospheric conditions and/or one or more of flow or pressure. The temperature sensor 47 and humidity sensor 48 may be disposed on or connected to a sealed tank reservoir 40.

The sealed tank reservoir 40 is outfitted with an electronic hot shoe 42 and has a temporarily-attached or otherwise refillable tank 46 filled with an exhaust simulation liquid. The electronic hot shoe 42 can be attached to a base of the sealed tank reservoir 40. An attached atomizer/vaporizer filament 45 (or other heating element) is included in the sealed tank reservoir 40. Vaporization occurs when the exhaust simulation liquid is drawn over the atomizer/vaporizer filament 45. Thus, the exhaust simulation liquid is atomized using heat.

The heating element also may be a heating coil, a ceramic heater, or another heating device besides the atomizer/vaporizer filament 45.

A filter 50, such as a High Efficiency Particulate Arresting (HEPA) filter, can be used in the device 13. The filter 50 is connected to the sealed tank reservoir 40, the sample inlet 10, or other components of the device 13.

A flow control housing mechanism 30 made up of individual flow control valves 31 can be used in the device 13. Some of the flow control housing mechanism 30 and flow control valves 31 may be under the battery 66 and are shown with dotted lines. The flow control valves 31 may be arranged in a flow controller array and can include a solenoid or other mechanisms. The flow control valves 31 are capable of electronically switching the sample flow. Thus, the flow control valves 31 can be connected at various points along sample channel tubing 12. The heating element, such as the atomizer/vaporizer filament 45, can affect particulate size distribution. Flow rate, exhaust simulation liquid, filtration, pressure, or other variables can affect particulate size distribution independent of or in conjunction with the heating element.

In an example, four flow control valves 31 are provided, though other numbers or configurations are possible. A first flow control valve 31 is disposed between the inlet 10 and the outlet 11, a second flow control valve 31 is disposed between the inlet 10 and the filter 50, a third flow control valve 31 is disposed between the sealed tank reservoir 40 and the filter 50, and a fourth flow control valve 31 is disposed between the sealed tank reservoir 40 and the outlet 11.

In an example, a controller is configured to open the first flow control valve and close the second, third, and fourth control valves such that ambient air flow through the apparatus. The controller is configured to open the second flow control valve and close the first, third, and fourth control valves such that filter air flows through the apparatus. The controller is configured to open the third flow control valve and close the first, second, and fourth control valves such that an unaltered PM/PN vapor sample flows through the apparatus. The controller is configured to open the fourth flow control valve and close the first, second, and third control valves such that a filtered PM/PN vapor sample flows through the apparatus. The sequence of these steps can vary and the additional steps or repeated steps can occur.

A power board 60 controls some or all on-board processing of the device. The device 13 includes a battery 66 and a voltage converter 65 to power the electronic hot shoe 42, a voltage-to-digital converter 61, and a wireless communications unit 62, which includes an input 63 and output 64 capability. Other power electronics can be included in the device 13. Sample channel tubing 12 can carry any exhaust, other gas, or other vapor. The device 13 also can include one or more rechargeable on-board batteries besides the battery 66. The device is controlled via a wired or wireless controller, such as computer 70. The device 13 can be commanded by either local or remote command communications using the computer 70. The device 13 can include a wireless or wired communications component for the computer 70 to send or receive instructions or information from the device 13.

The battery 66 may be a rechargeable lithium ion battery in one example, though other battery types may be used. While a battery 66 is disclosed, an external power supply (e.g., battery pack or fixed power source) also may be used. Additional batteries may be included, such as an additional battery to power the electronic hot shoe 42 or other heating element.

The filter 50 can be configured to be replaceable. The filter 50 also can have a filtration media of a consistent and known particle size reduction and/or removal capacity. For example, the filter 50 can be a HEPA filter at 0.3 micrometers/300 nm or an ultra-low particulate air (ULPA) at 0.12 micrometers/120 nm filtration.

In an instance, the liquid fluid in the sealed tank reservoir 40 includes, consists of, or consists essentially of a liquid exhaust vaporizer fuel and, optionally, a scrubber fluid. The liquid exhaust vaporizer fuel may be one or more of vegetable glycerin, propylene glycol, saline, and other safe, non-toxic ingredients. The scrubber fluid may be a blend of water-soluble alcohol(s) and solvents. Other mixtures for particular simulations are possible. These materials are merely listed as examples.

The device 13 can be configured to be portable. The average person may be able to carry the device 13 using one hand.

The device 13 can be configured to perform variable-sized particle generation and/or PM/PN calibration utilizing ambient temperature, humidity, and flow measurements. These may be separate and distinct capabilities or may be combined. When combined, these tasks perform a unified function to generate a controlled PM/PN reference sample and assign a local correction based ambient, and/or situational atmospheric conditions, in order to provide an accurate and standardized measure of PM/PN delivery.

The device 13 can perform a user-selected series of conditions or commands or can perform a predetermined series of optimized conditions and instructions through a computer interface. For example, ambient air enters the device 13 through the air inlet via negative air pressure, created either by, for example, an optional internal micro-pump, another type of pump, or by an external PM/PN sensing system with its own pump mechanism. The ambient air passes through a pressure sensor device and the ambient air is then shunted through one of four flow pathways as per a predetermined and optimized computer-controlled sequence for a conditioning process. Temperature and humidity can be continuously measured while the ambient air passes through the pressure sensor device. As an example: 1) ambient air channel provides in-situ reference of background PM/PN; 2) filtered air channel provides a "zero-air" reference; 3) PM/PN vapor sample via ambient air channel creates a particle size variation sample; and 4) PM/PN vapor sample via filtered channel creates a nanoparticle subset sample.

The device 13 can be configured to generate PM, vapor, and/or nanoparticles in a precisely controlled format. For example, a consistent, measurable, and predictable exhaust simulation liquid, with a consistent voltage output and length of charge digitally controlled via software can be used to provide a precise output for a particular application. The exact output may vary depending on the desired application.

A computer-controlled pre-optimized calibration example shown as steps #1-6 in FIGS. 5-10. The system can include an electronic control unit (ECU), such as a controller. For example, the computer 70 or another controller can be configured to control steps #1-6. In FIGS. 5-10, closed flow control valves 31 have hatching and open flow control valves 31 do not have hatching. The flow path followed by the fluid or vapor is show with a solid line, whereas blocked flow paths are shown with dotted lines. A flow sensor 22 is illustrated on the fluid pathway.

Step #1 (FIG. 5) is an example of "Ambient Calibration." Three of four flow control valves are in the closed position, forcing ambient air through the only remaining, or ambient pathway, bypassing the vaporization and filter channels, thereby providing an unaltered, in-situ reference of existing background PM/PN. Step #1 may run for a period, such as 20 seconds.

Step #2 (FIG. 6) is an example of "Filter Calibration." Three of four flow control valves are in the closed position, forcing ambient air through the only remaining filter pathway, bypassing the vaporization and ambient channels, thereby providing a filtered, or "zero-air" reference. Step #2 may run for a period, such as 10 seconds.

Step #3 (FIG. 7) is an example of "Exhaust Ambient Calibration" (vapor introduction). Three of four flow control valves are in the closed position, forcing ambient air through the only remaining vapor pathway, bypassing the filter and ambient channels, thereby providing an unaltered PM/PN vapor sample which introduces particle size variation. Step #3 may run for a period, such as 25 seconds, and include bursts, such as five sample or exhaust bursts.

Step #4 (FIG. 8) is an example of "Exhaust Filter Calibration" (vapor through filter). Three of four flow control valves are in the closed position, forcing ambient air through the only remaining vapor/filter pathway, bypassing the ambient channel, flowing first through the vapor mechanism and then the filter medium, thereby providing a filtered PM/PN vapor sample which restricts particle size and creates a nano-particle subset. Step #4 may run for a period, such as 25 seconds, and include bursts, such as five sample or exhaust bursts.

Step #5 (FIG. 9) is a repeat of "HEPA Calibration." Three of four flow control valves are in the closed position, forcing ambient air through the only remaining filter pathway, bypassing the vaporization and ambient channels, thereby providing a filtered, or "zero-air" reference. Step #5 may run for a period, such as 10 seconds.

Step #6 (FIG. 10) is a repeat of "Ambient Calibration." Three of four flow control valves are in the closed position, forcing ambient air through the only remaining, or ambient pathway, bypassing the vaporization and filter channels, thereby providing an unaltered, in-situ reference of existing background PM/PN. Step #6 may run for a period, such as 20 seconds.

The timing and sequence of these six steps can vary. In an embodiment, not all the six steps are performed. Some or all of the sequence may repeat.

The data from each step can be compartmentalized and archived to reference back to previous run cases. A relational database can be used for storing records. Data from each step can be recorded at a minimum of 1 Hz basis. Step #1 and Step #6 are preparatory steps that set up the gas flow paths and sensors for baseline conditions. Data from these steps may be analyzed for linearity checks and sensor noise. Step #2 and Step #5 set up the device baseline and generating "clean air." Sensor data from these steps may be analyzed for noise over a moving window average basis. Step #3 data may be used to estimate the coarse and fine PM response of device to be calibrated (e.g., parSYNC manufactured by 3DATX Corporation of Buffalo, N.Y.). Step #4 data may be used to estimate ultrafine PM response of device to be calibrated. Depending on application, the PM generation can be impulse, saw tooth, or step response functions.

The outputs can be valve on/off time, heating element on/off time, heating element level control, gas flow metric, and/or humidity and/or temperature for the sample train. When coupled with a PM measurement device, the outputs may be all of the above, with, sensor detection limit, linearity, and/or span metrics. In the example where an external stand-alone device is being calibrated, the response of sensors may be tuned based on a combination clean, fine PM, and/or ultrafine PM states of the device. As an example, an ultra-fine particle sensor calibration will be weighed more by its response to Step #4, while a fine or coarse particle sensor will be weighed more by its response to Step #3.

Figure 11:
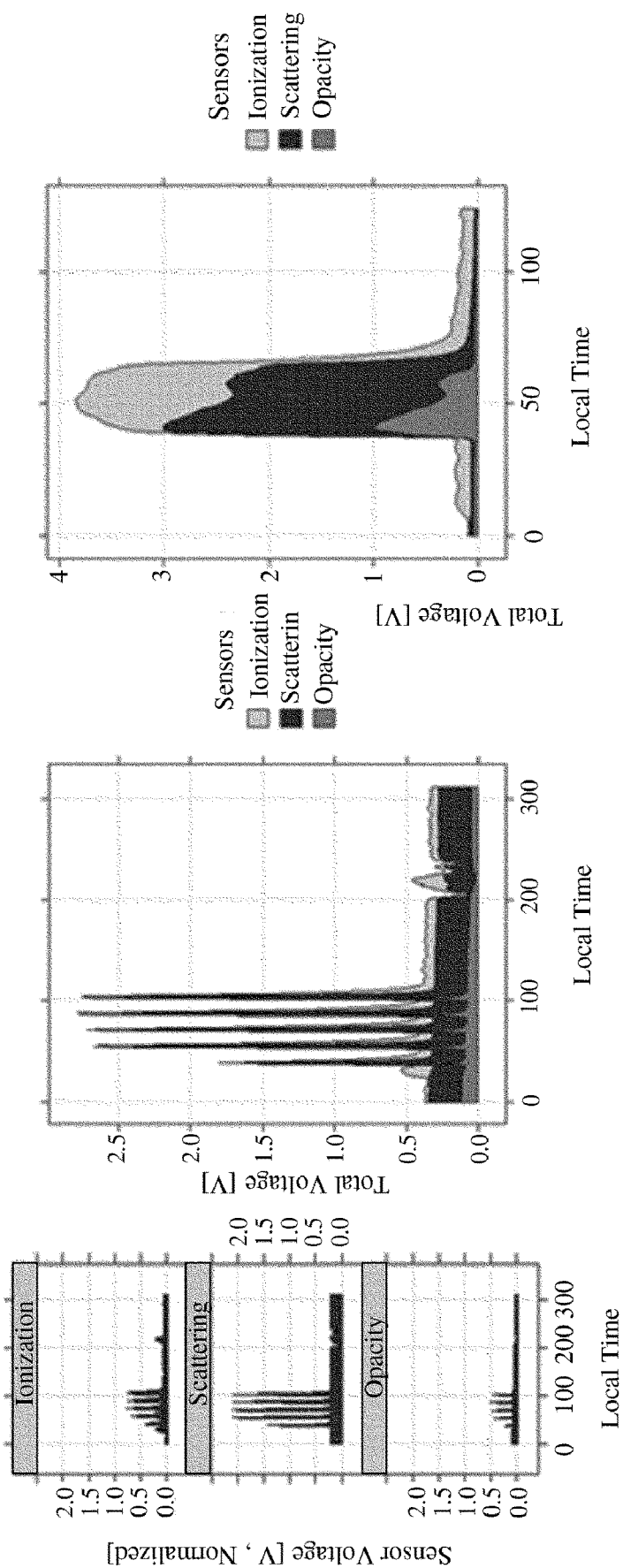
FIG. 11 shows exemplary calibration results for a complete calibration sequence (Ambient, Filtered, Vapor, Vapor/Filtered, Filtered, and Ambient run)
Figure 12:
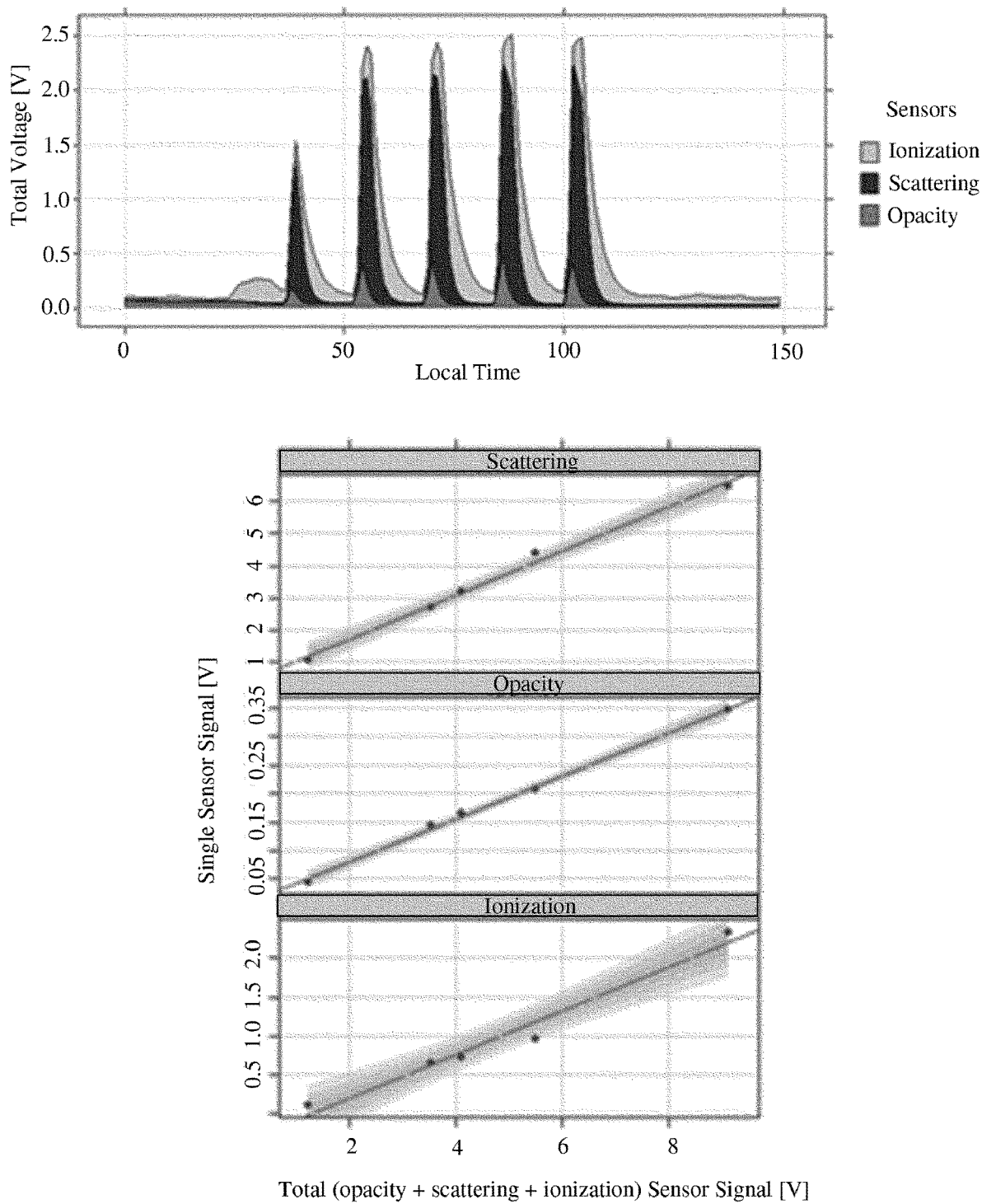
FIG. 12 shows exemplary calibration results for a series of vapor "bursts," and a graph demonstrating predictability.

FIG. 11 shows exemplary calibration results for a complete calibration sequence (Ambient, Filtered, Vapor, Vapor/Filtered, Filtered, and Ambient run). FIG. 12 shows exemplary calibration results for a series of vapor "bursts", and a graph demonstrating predictability. FIGS. 11 and 12 are provided for impulse mode calibration. In an example, there are five (5) pulses of tightly controlled time and strength of PM generation. The first pulse is treated as mode transition and omitted from subsequent calibration. The width and height of sensor response to each pulse refers to the sensor response speed and response capacity, respectively. In another example, a known testing run (e.g., US "Federal Test Procedure" (FTP)) with a desired output and/or signature (e.g., Manhattan Cycle, IM240 Cycle, Orange County Cycle, UDDS Cycle, or WVU Cycle) typically performed on a chassis or engine dynamometer can be converted from speed and/or pollutant outputs into a corresponding voltage/amperage and/or PM/PN output as a device simulation. Other outputs or results are possible and these are merely examples.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. An apparatus for generating reference particulate (particulate matter (PM)/particle number (PN)) and creating conditions for a PM/PN simulation and/or facsimile event, comprising: a housing having an inlet and an outlet; a filter configured to remove of a specific diameter of particulates; a removable liquid exhaust tank mounted in a sealed tank reservoir within a flow path, the liquid exhaust tank configured to contain a fluid; a sealed tank reservoir; a heating element mounted within the sealed tank reservoir, wherein the heating element is configured to provide a variable fluid vaporization rate, and wherein the heating element is configured to atomize the fluid; a rechargeable power source within the housing and electronically coupled to the heating element; and one or more sensors to measure at least one of pressure, flow, temperature, or humidity and an electronics sub-system electronically coupled to the rechargeable power source, wherein the electronics sub-system is configured to control the heating element, wherein the electronics sub-system is configured to remotely control a vaporizing and atomization process using length of time and strength of charge thereby causing the heating element to vaporize a variable portion of the fluid.

2. The apparatus of claim 1, wherein the fluid comprises a liquid exhaust vaporizer fuel comprising at least one of vegetable glycerin, propylene glycol, or saline.

3. The apparatus of claim 2, wherein the fluid further comprises a blend of at least one water-soluble alcohol and at least one solvent.

4. The apparatus of claim 1, further comprising four flow control valves, wherein a first flow control valve is disposed between the inlet and the outlet, wherein a second flow control valve is disposed between the inlet and the filter, wherein a third flow control valve is disposed between the sealed tank reservoir and the filter, and wherein a fourth flow control valve is disposed between the sealed tank reservoir and the outlet.

5. The apparatus of claim 4, further comprising a controller, wherein the controller is configured to:
open the first flow control valve and close the second, third, and fourth control valves such that ambient air flow through the apparatus;
open the second flow control valve and close the first, third, and fourth control valves such that filtered air flows through the apparatus;
open the third flow control valve and close the first, second, and fourth control valves such that an unaltered PM/PN vapor sample flows through the apparatus; and
open the fourth flow control valve and close the first, second, and third control valves such that a filtered PM/PN vapor sample flows through the apparatus.

6. The apparatus of claim 1, wherein the filter is configured to provide particle sizing and particle distribution functions in both the ambient air sampling and a liquid exhaust vaporization process, wherein a filter flow path is designed to be utilized by both the ambient air sample and the vapor sample.

7. The apparatus of claim 1, further comprising a pump.

8. The apparatus of claim 1, further comprising: flow control valves electronically coupled to the rechargeable power source; and the electronics sub-system is configured to control the flow control valves.

9. The apparatus of claim 8, wherein the electronic sub-system comprises a logic processor, a power board, a wireless or wired communications component, and a voltage-to-digital converter.

10. The apparatus of claim 1, wherein the outlet is configured to couple to a separate and external PM/PN measurement device or a separate and external pump mechanism.

11. The apparatus of claim 1, wherein the heating element is a hot shoe, a heating coil, or a ceramic heater.

12. A method for controlling the vaporization of a fluid comprising: atomizing a fluid using a heating element in a housing, wherein the heating element is electronically coupled to a rechargeable power source within the housing; and generating reference particulate and creating conditions for a PM/PN simulation and/or facsimile event and an electronics sub-system electronically coupled to the rechargeable power source, wherein the electronics sub-system is configured to control the heating element, wherein the electronics sub-system is configured to remotely control a vaporizing and atomization process using length of time and strength of charge thereby causing the heating element to vaporize a variable portion of the fluid.

13. The method of claim 12, wherein the reference particulate includes a PM or a PN.

14. The method of claim 12, further comprising creating conditions for a PM or PN simulation.

15. The method of claim 12, wherein the fluid comprises a liquid exhaust vaporizer fuel comprising at least one of vegetable glycerin, propylene glycol, or saline.

16. The method of claim 15, wherein the fluid further comprises a blend of at least one water-soluble alcohol and at least one solvent.

17. The method of claim 12, wherein the housing has an inlet and an outlet, and further comprising providing an apparatus including:

a filter configured to remove of a specific diameter of particulates;

a removable liquid exhaust tank mounted in a sealed tank reservoir within a flow path, the liquid exhaust tank configured to contain the fluid;

a sealed tank reservoir wherein the heating element is mounted within the sealed tank reservoir, wherein the heating element is configured to provide a variable fluid vaporization rate, and wherein the heating element is configured to atomize the fluid; and four flow control valves, wherein a first flow control valve is disposed between the inlet and the outlet, wherein a second flow control valve is disposed between the inlet and the filter, wherein a third flow control valve is disposed between the sealed tank reservoir and the filter, and wherein a fourth flow control valve is disposed between the sealed tank reservoir and the outlet.

18. The method of claim 17, further comprising:

opening the first flow control valve and closing the second, third, and fourth control valves such that ambient air flow through the apparatus;

opening the second flow control valve and closing the first, third, and fourth control valves such that filtered air flows through the apparatus;

opening the third flow control valve and closing the first, second, and fourth control valves such that an unaltered PM/PN vapor sample flows through the apparatus; and opening the fourth flow control valve and closing the first, second, and third control valves such that a filtered PM/PN vapor sample flows through the apparatus.

19. The method of claim 12, wherein the heating element is a hot shoe, a heating coil, or a ceramic heater.

20. The method of claim 12, wherein the atomizing does not include combustion.

* * * * *